(12) United States Patent
Bordini

(10) Patent No.: US 8,091,660 B2
(45) Date of Patent: Jan. 10, 2012

(54) HYBRID TRACTION SYSTEM

(75) Inventor: Giorgio Bordini, Formigine (IT)

(73) Assignee: Bordini Engineering S.R.L., Modena (IT)

( * ) Notice: Subject to any disclaimer, the term of this patent is extended or adjusted under 35 U.S.C. 154(b) by 855 days.

(21) Appl. No.: 11/990,022

(22) PCT Filed: Aug. 1, 2006

(86) PCT No.: PCT/IB2006/002089
§ 371 (c)(1),
(2), (4) Date: Apr. 29, 2008

(87) PCT Pub. No.: WO2007/017719
PCT Pub. Date: Feb. 15, 2007

(65) Prior Publication Data
US 2009/0139784 A1    Jun. 4, 2009

(30) Foreign Application Priority Data

Aug. 5, 2005 (IT) .............................. MO2005A0209

(51) Int. Cl.
*B60K 6/20* (2007.10)
(52) U.S. Cl. ......... 180/65.23; 903/906; 475/5; 475/149; 475/150
(58) Field of Classification Search ............. 475/5, 149, 475/150; 180/65.21–22, 246, 265–29; 903/90, 903/924–925
See application file for complete search history.

(56) References Cited

U.S. PATENT DOCUMENTS

| | | | |
|---|---|---|---|
| 5,931,757 A | 8/1999 | Schmidt | |
| 6,634,247 B2 * | 10/2003 | Pels et al. | 74/329 |
| 6,647,816 B1 * | 11/2003 | Vukovich et al. | 74/339 |
| 6,833,632 B2 * | 12/2004 | Becker et al. | 290/55 |
| 6,941,830 B2 * | 9/2005 | Ibamoto et al. | 74/339 |
| 6,951,149 B2 * | 10/2005 | Yamamoto et al. | 74/335 |
| 7,004,884 B2 * | 2/2006 | Cho | 477/3 |
| 7,093,512 B2 * | 8/2006 | Ibamoto et al. | 74/339 |
| 7,223,201 B2 * | 5/2007 | Colvin et al. | 477/5 |
| 7,249,537 B2 * | 7/2007 | Lee et al. | 74/661 |

(Continued)

FOREIGN PATENT DOCUMENTS

DE   198 49 156    9/1999

(Continued)

OTHER PUBLICATIONS

International Search Report for PCT/IB2006/002089 mailed Mar. 6, 2007.

(Continued)

*Primary Examiner* — J. Allen Shriver, II
*Assistant Examiner* — James Triggs
(74) *Attorney, Agent, or Firm* — Nixon & Vanderhye P.C.

(57) ABSTRACT

A hybrid traction system for the traction of a vehicle comprises an internal combustion engine, at least a first electric machine and at least a second electric machine, first transmission means suitable for being connected mechanically to said internal combustion engine and to at least one of said electric machines, second transmission means suitable for being connected mechanically to at least one of said electric machines and to the wheels of the vehicle; the system comprises furthermore connecting or restraining means suitable for enabling mechanical power to be transmitted to the wheels of the vehicle only by the internal combustion engine through said first transmission means and said second transmission means. This allows to drive the vehicle using only the internal combustion engine.

15 Claims, 3 Drawing Sheets

U.S. PATENT DOCUMENTS

| | | | |
|---|---|---|---|
| 7,464,616 B2 * | 12/2008 | Leibbrandt et al. | 74/331 |
| 7,469,613 B2 * | 12/2008 | Krauss et al. | 74/340 |
| 7,476,176 B2 * | 1/2009 | Ibamoto et al. | 477/15 |
| 7,490,526 B2 * | 2/2009 | Forsyth | 74/330 |
| 7,552,658 B2 * | 6/2009 | Forsyth | 74/329 |
| 7,604,565 B2 * | 10/2009 | Lee et al. | 477/3 |
| 7,665,376 B2 * | 2/2010 | Forsyth | 74/330 |
| 7,784,573 B2 * | 8/2010 | Kluge et al. | 180/65.22 |
| 2003/0106729 A1 | 6/2003 | Noreikat et al. | |

FOREIGN PATENT DOCUMENTS

| | | |
|---|---|---|
| EP | 838 359 | 4/1998 |
| EP | 1 199204 | 4/2002 |
| EP | 1 279 545 | 1/2003 |
| EP | 1 317 050 | 6/2003 |
| EP | 1 491 427 | 12/2004 |
| JP | 2000-014081 | 1/2000 |
| JP | 2000-142135 | 5/2000 |
| JP | 2000-142138 | 5/2000 |

OTHER PUBLICATIONS

International Preliminary Report on Patentability dated Aug. 2, 2007.
English Translation of Notification of Reasons for Refusal for corresponding JP Appln No. 2008-524611, mailed Mar. 22, 2011, 3 pages.
Notification of Reasons for Refusal (with English Translation) for corresponding JP Appln No. 2008-524611, mailed Sep. 13, 2011, 4 pages.

* cited by examiner

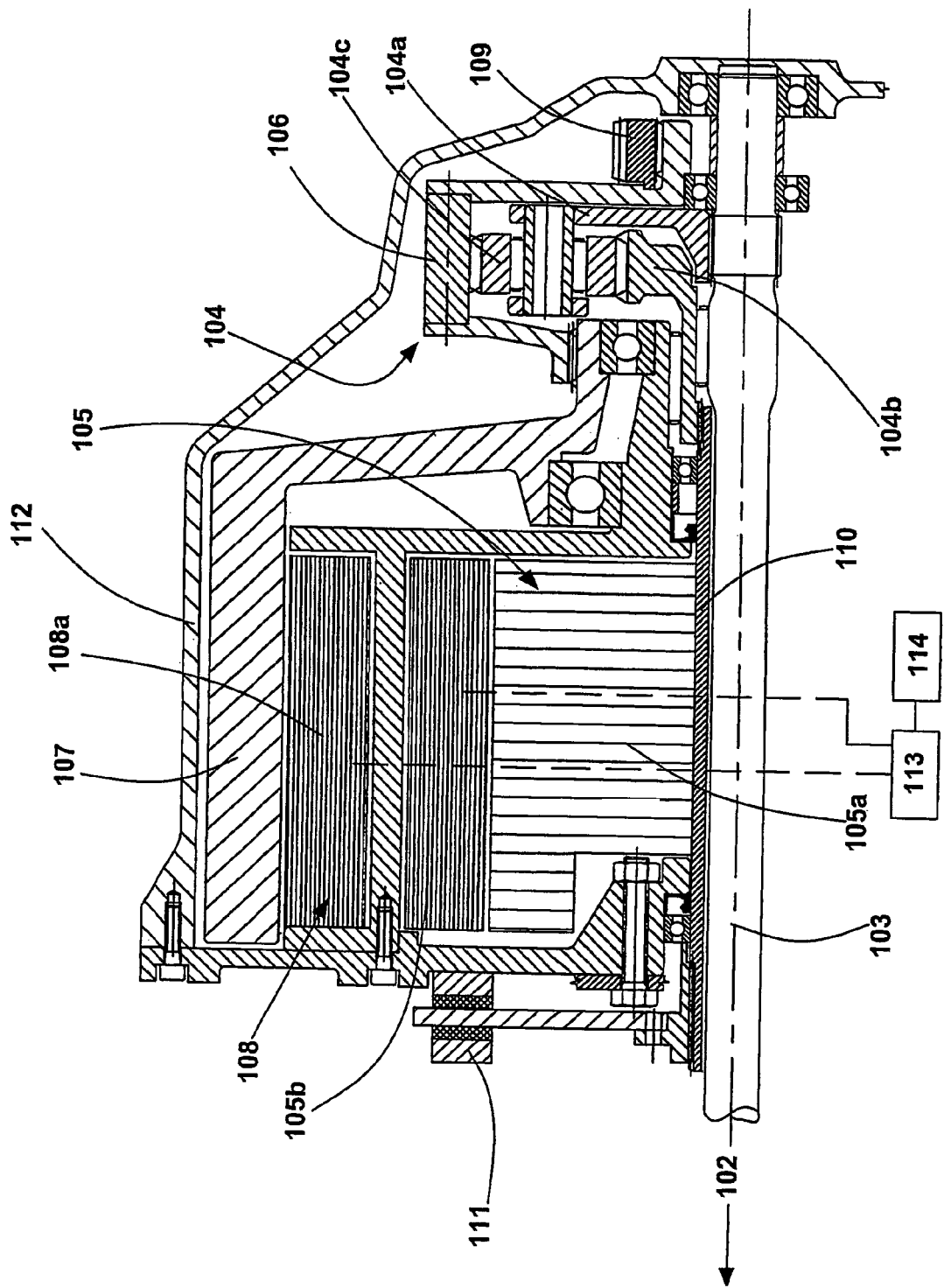

HYBRID TRACTION SYSTEM

This application is the U.S. national phase of International Application No. PCT/IB2006/002089 filed 1 Aug. 2006 which designated the U.S. and claims priority to IT MO2005A000209 filed 5 Aug. 2006, the entire contents of each of which are hereby incorporated by reference.

The present invention relates to a hybrid traction system of thermoelectric type, i.e. to a traction system in which the power used in the traction is supplied by at least a heat engine and/or by at least an electric machine.

In the prior art, two types of hybrid traction systems are known: the serial hybrid system and the parallel hybrid system.

In the serial hybrid system an internal combustion engine generates mechanical energy that is supplied to an electric generator that generates electric energy that is partially stored in storage batteries and partially supplies an electric motor that provides the vehicle with traction. In these systems the energy that is necessary for the vehicle traction is thus produced by a heat engine, but traction is provided by means of an electric motor.

The presence of the electric motor, in the slowing and braking phases enables, by operating said motor as a generator, part of the kinetic energy of the vehicle to be recovered by converting it into electric energy that is stored in the storage batteries, which batteries can be used to supply both the electrical installations of the vehicle and the electric traction motor.

In parallel hybrid systems the traction of the vehicle is assured simultaneously by the combustion engine and by the electric motor that both transmit mechanical energy to the wheels. An electric generator may also be provided that is coupled with the combustion engine to recharge the storage batteries and possibly to supply the electric motor.

If on the one hand the presence of the electric motor for the traction to the wheels enables the internal combustion engine to be run in optimal conditions, i.e. in conditions of maximum efficiency, it on the other hand entails an increase in losses, inasmuch as in addition to the mechanical losses present in any vehicle through the transmission of power to the wheels there are added the electrical losses of the electric machines present in the hybrid traction systems that are normally several times greater than the mechanical losses. This is because it is not possible with either type of hybrid system to exclude the electric machines from the traction system by driving the vehicle only with the internal combustion engine, even when the conditions occur in which the vehicle can be driven just by the internal combustion engine in the maximum efficiency operating condition thereof, i.e. motion conditions at almost constant speed, as occurs normally on non-urban or motorway journeys.

Another drawback of hybrid traction systems, in particular of parallel hybrid traction systems are the significant overall dimensions, which make them unsuitable for use in vehicles of small dimensions.

US 2003/0106729A1 discloses a hybrid drive comprising an internal combustion engine, an engine power-output shaft of said internal combustion engine, a transmission power-input shaft arranged axially with respect to the engine power-output shaft, an engageable clutch, which is arranged coaxially to the rotational center line of the engine power-output shaft and the transmission power-input shaft for the purpose of connecting the two shafts in a torque transmitting manner; a first electric machine coaxial to the rotational center line of the engine power-output shaft, which has a stator and a rotor, the rotor of the first electric machine being connected to the engine power-output shaft in a torque-transmitting manner, and a second electric machine coaxial to the rotational center line, which has a stator and a rotor, the rotor of the second electric machine being connected to the transmission power-input shaft in a torque transmitting manner.

EP 1199204 discloses a propulsion unit for a vehicle, comprising a diesel engine and at least two electrical machines; said diesel engine and said at least two electrical machines being connected mechanically to a device for subdivision/recombination of the powers delivered by said diesel engine and delicered/absorbed by said electrical machines, said electrical machines being able to operate both ad generators and as motors; the unit is configured such that in at least one interval of the ground speed of the tractor the electrical fraction of the power delivered/absorbed by the said electrical machines is zero.

DE 19849156 discloses a drive train for a motor vehicle, whereby bridging occurs when the traction force transmitted from an internal combustion engine to a gear box is interrupted by opening at least one clutch system. In order to achieve this, a device with an electric machine is used, whereby said machine is connected to the drive side, especially to the output shaft of a gear box. When the traction force is interrupted by means of the at least one clutch system, traction force is transmitted.

EP 1317050 discloses a hybrid power train for a vehicle comprising an internal combustion engine and at least two electric machines which are connected mechanically to a device for dividing/recombining the power generated by said engine and generated/drawn by said electric machines, so that said electric machine function both as generators and as motors.

U.S. Pat. No. 5,931,757 discloses a two-mode, compound-split, electromechanical transmission utilizing an input member for receiving power from an engine, and an output member for delivering power from the transmission. First and second motor/generators are operatively connected to an energy storage device through a control for interchanging electrical power among the storage means, the first motor/generator and the second motor/generator. The transmission employs three planetary gear subsets which are coaxially aligned. Each planetary gear arrangement utilizes first and second gear members, and each first and second gear members meshingly engage a plurality of planet gears rotatably mounted on a carrier. The first and second motor/generators are coaxially aligned with each other as well as the three planetary gear subsets which are circumscribed by the first and second motor/generators. At least one of the gear members in the first or second planetary gear subsets is connected to the first motor/generator. Another gear member in the first or second planetary gear arrangement is connected to the second motor/generator. The carriers are operatively connected to the output member. One of the gear members of the first or second planetary gear subsets is continuously connected to one of the gear members in the third planetary gear subset. Another gear member of the first or second planetary gear subset is operatively connected to the input member, and one gear member of the third planetary gear subset is selectively connected to ground.

An object of the present invention is to provide a hybrid internal thermoelectric traction system that in given conditions enables a vehicle to be driven even using only the internal combustion component of the traction, i.e. the internal combustion engine, excluding the electric component, so as to improve the efficiency of the system by eliminating the losses of an electrical nature.

A second object of the present invention is to provide a hybrid traction system that is more compact and less cumbersome, so as to be able to be mounted also on vehicles of relatively reduced dimensions.

According to the present invention there is provided a hybrid traction system for the traction of a vehicle comprising an internal combustion engine, at least a first electric machine and at least a second electric machine, a first transmission element connected mechanically to said internal combustion engine and to at least one of said electric machines, a second transmission element suitable for being connected mechanically to at least one of said electric machines and to the wheels of the vehicle, connecting or restraining elements suitable for allowing the transmission of mechanical power to the wheels of the vehicle only by the internal combustion engine through said first transmission element and said second transmission element, characterized in that said first transmission element comprises a drive shaft that is connectable to said internal combustion engine and said second transmission element comprises a hollow driven shaft, said drive shaft being inserted through said hollow driven shaft so as to be able to rotate freely with respect thereto, a rotor of a first electric machine being fitted on said drive shaft and a rotor of a second electric machine being fitted on said driven shaft.

Owing to the invention it is possible to drive the vehicle even with only the internal combustion engine, excluding electric traction, when conditions of constant or substantially constant motion speed occur or motion speeds occur that are variable by means of mere adjustment of the operational setting of the internal combustion engine.

The invention will now be disclosed with reference to the attached drawings, in which:

FIG. 3 is a longitudinal section of a third embodiment of a hybrid traction apparatus according to the invention.

Figure 1:
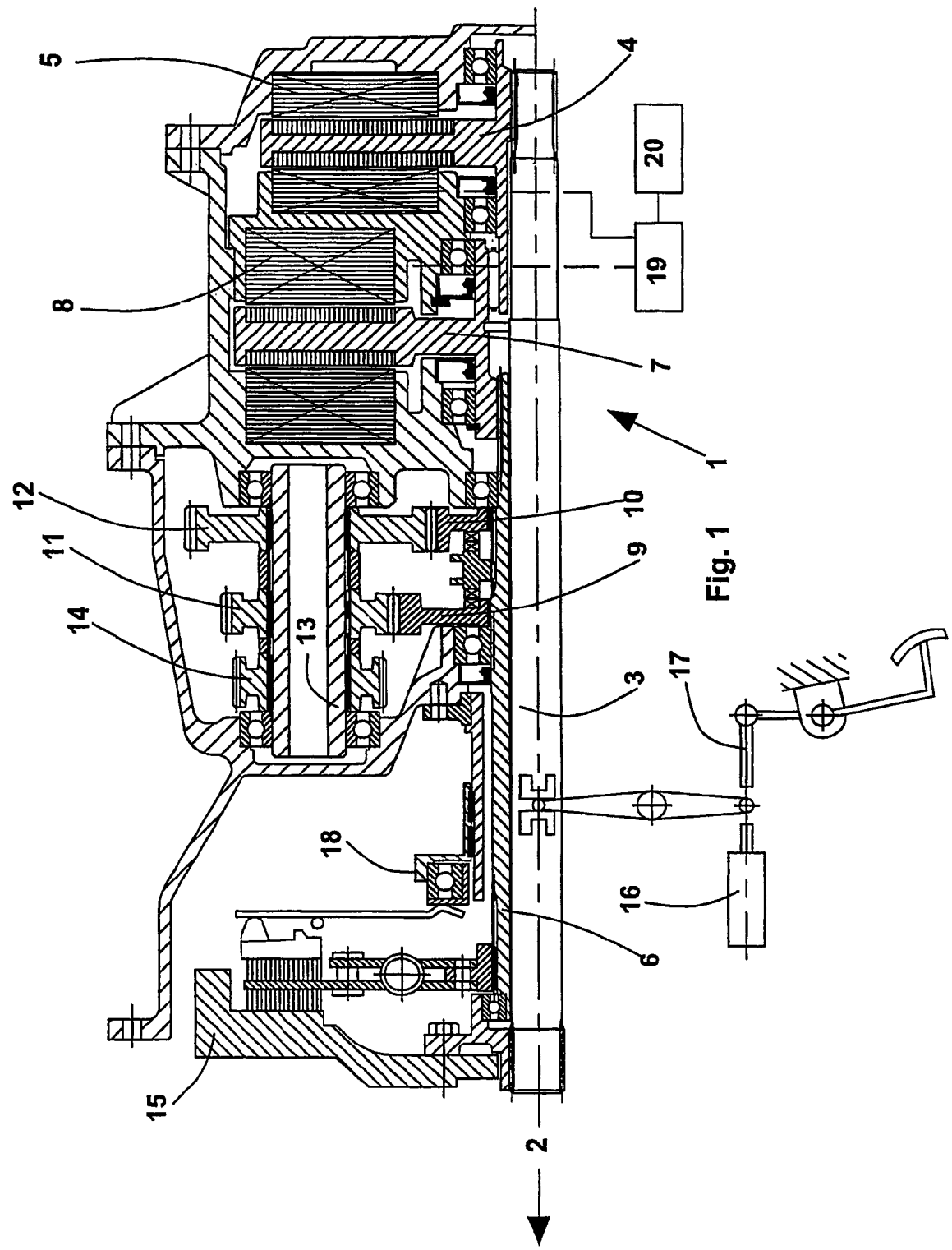
FIG. 1 is a longitudinal section of a first embodiment of a hybrid traction apparatus according to the invention.

With reference to FIG. 1, 1 indicates an apparatus according to the invention comprising an internal combustion engine 2 (not shown) the outlet shaft of which is connected mechanically to a drive shaft 3, on which there is fitted a first rotor 4 of a first electric machine 5. A hollow driven shaft 6 is inserted on the shaft 3, so as to be able to rotate freely with respect thereto. On the driven shaft 6 there are fitted a second rotor 7 of a second electric machine 8 and a first gear wheel 9, or a first pair of gear wheels 9 and 10, that engages or respectively engage with a respective gear wheel 11, or with respective gear wheels 11 and 12 of a second pair of gear wheels, fitted on an auxiliary shaft 13 on which there is in turn fitted a further gear wheel 14 that transmits motion to the traction wheels of the vehicle.

The first shaft 3 and the hollow shaft 6 can be made integral by means of a friction clutch 15 that is drivable by means of a programmable automatically controlled actuator or of a pedal 17 that control a sleeve 18 for engaging or disengaging the friction clutch 15.

The first electric machine 5 and the second electric machine 8 are connected electrically to an electric power converting and regulating device 19 and an electric energy accumulating device 20, indicated only schematically in FIG. 1.

The system according to the invention enables very flexible operation according to different modes, depending on vehicle motion conditions, which will be disclosed in detail below.

Forward or Backward Motion Mode with Purely Electric Traction.

In this mode, the friction clutch 15 is kept disengaged by the actuator 16 or by the pedal 17 in such a way that the drive shaft 3 and the driven shaft 6 are not connected together mechanically. The second electric machine 8, supplied by the accumulating device 20 through the converting device 19, drives the driven shaft 6 that through the gear wheels 9 and 11, or the gear wheels 10 and 12 drives the auxiliary shaft 13 that in turn drives, through the further gear wheel 14, the final transmission system of the motion to the wheels of the vehicle, thus transmitting mechanical power to the wheels. The two pairs of gear wheels 9, 11 and 10, 12 constitute a two-speed speed-changing gear that is selectable by means of known devices that enables two transmission ratios between the driven shaft 6 and the auxiliary shaft 13, i.e. a reduced ratio for low speeds, when the gear wheels 10 and 12 are engaged, and a higher ratio for higher speeds, when the gear wheels 9 and 11 are engaged. In this operating mode, all the power necessary for the traction of the vehicle is taken from the accumulating device 20 and the internal combustion engine is switched off. During the slowing or braking phases of the vehicle the second electric machine 8 can be operated as a generator to convert part of the kinetic energy of the vehicle into electric energy to be sent to the accumulating device 20.

Vehicle performance depends solely on the second electric machine 8, on the converting and regulating device 19 and on the accumulating device 20. Vehicle speed can be varied continuously by varying the speed of the second electric machine 8, acting as a motor. The range of the vehicle depends on the availability of electric energy in the accumulating device. The energy losses of the system are prevalently of electric type.

Reverse movement of the vehicle does not require a specific gear ratio but is obtained simply by reversing the rotation direction of the second electric machine 8 by means of the conversion and control device 19.

Motion Mode with Serial Hybrid Traction.

Also in this mode, the friction clutch 15 is kept disengaged by the actuator 16 or by the pedal 17 in such a way that the engine shaft 3 and the driven shaft 6 are not mechanically connected together.

The internal combustion engine 2 drives, by means of the engine shaft 3, the first electric machine 5, which acts as a generator, generating electric power that is stored in the accumulating device 20. Traction to the wheels is assured by the second electric machine 8, acting as a motor, as already disclosed with reference to purely electric traction operation.

The obtainable performance depends only on the second electric machine 8, on the converting and regulating device 19 and on the accumulating device 20, in addition to the ratio selected at the speed-changing gear, and is on average greater than the previous case, inasmuch as the reference voltage of the accumulating device 20 is nearer nominal conditions, inasmuch as the accumulating device is supplied continuously with electric energy produced by the first electric machine 5.

The range depends on the availability of electric energy, on the fuel consumption per kilometre of the internal combustion engine, and on the quantity of fuel stored in the vehicle. All power to the wheels is supplied by the second electric machine 8.

The prevalent power losses are of electric type due to the electric machines 5 and 8, to the converting and regulating device 19 and to the accumulating device 20.

Forward Motion Mode in Purely Mechanical Traction

If the conditions allow it, and on average at the start of sections to be travelled at not too variable speeds that are high on average, for example on non-urban or motorway journeys, after a given vehicle speed and a given rpm of the heat engine have been reached the friction clutch 15 is engaged by means of the actuator 16 or the pedal 17, thus making the engine shaft 3 and the driven shaft 6 integral. In this way the combustion engine actuates the driven shaft 6 directly and, through the speed change, the auxiliary shaft 13 that transmits to the final transmission to the wheels of the vehicle.

In this operating mode the power moves from the heat engine to the traction wheels via a purely mechanical path, the electric machines 5 and 8 are deactivated and thus all the electric losses are excluded that are linked to the transmission of power to the traction wheels.

One or both the electric machines 5 and 8 can also be operated as generators, supplied by the internal combustion engine, to provide electric energy to the accumulating device 20 to recharge it and/or to supply the auxiliary electrical installations of the vehicle, or as generators dragged by the traction wheels of the vehicle in the event of slowing or braking.

Speed variations of the vehicle can be achieved within the limits allowed by the motor propulsion system overall, according to different modes that are selectable according to circumstances. For example, the speed variation can be achieved by acting exclusively on the degree of admission of the heat engine, thus varying the torque and the rpm of the heat engine.

Motion Mode of Parallel Hybrid Traction Type

When the speed of the vehicle has to be increased rapidly, as in the case of overtaking, or when a significant power increase is required, as in ascending a slope, in addition to varying the degree of admission of the heat engine, it is possible to regulate the speed of the vehicle and the power transmitted to the wheels by means of the electric machines 5, and 8 by making one or both operate as motors, summing the power produced by them to the power dispensed by the heat engine.

Furthermore, by operating the electric machines 5 and 8 as generators, breaking torque is produced to decelerate the vehicle, producing at the same time electric energy for recharging the accumulating device 20. If a great speed decrease is required, the friction clutch 15 must be disengaged so that the heat engine does not slow down excessively.

Energy Recovery Mode During Slowing and Braking in Forward Motion.

According to the slowing and braking mode, different configurations are possible:
- if the braking torque to be transmitted to the wheels by the traction system is medium-low, at medium-low speed, or medium to medium-high speed the friction clutch can be disengaged and the second electric machine 8, acting as a generator, can be made to generate braking torque; the electric energy produced by the electric machine 8 is stored in the accumulating device 20;
- if the aforesaid braking torque is medium-high, it can be generated by exploiting the engine brake of the internal combustion engine and the braking torque generated by the electric machines 5 and 8 operating as generators, in this way the friction clutch 15 has to be engaged. The electric energy produced by the electric machines 5 and 8 operating as generators is stored in the accumulating device 20;
- lastly, if it is required that the aforesaid braking torque is high at high speed, it is advantageous to disengage the friction clutch and accelerate the combustion engine, through the engine shaft 3, by means of the first electric machine 5, whilst the second electric machine 8 is made to operate as a generator. The required braking power is thus provided by the engine brake of the internal combustion engine accelerated by the first electric machine 5 and by the difference between the electric power dispensed by the second electric machine 8 and that absorbed by the first electric machine 5 operating as a motor, this difference being stored in the accumulating device 20.

Starting up the Combustion Engine

There are two possible modes for starting up the heat engine, regardless of whether the heat engine requires a medium-low startup torque, as in general is the case with petrol engines, or a high value, as is the case with diesel engines, particular in cold climatic conditions.

If the required torque is of medium-low value, the engine can be started up, regardless of the vehicle's motion conditions, by actuating the first electric machine 5 as a motor, to rotate the heat engine by means of the engine shaft 3, keeping the friction clutch 15 disengaged, without altering the motion state of the vehicle that depends, at the moment, on the second electric machine 8.

If the required torque value is of a high value, the engine is started up by driving both electric machines 5 and 8 as motors and engaging the friction clutch 15, in such a way that the engine is rotated by both the electric machines by means of the transmission shaft 3 and the driven shaft 6. Obviously, in this case the electric machines 5 and 8 will rotate at the same speed and the speed change will be placed in the neutral position.

Starting up the Vehicle

The system according to the invention enables four vehicle startup modes.

In a first startup mode, the first electric machine 5 and the second electric machine 8 are deactivated and startup occurs by connecting the internal combustion engine 2 to the wheels of the vehicle by means of the friction clutch 15. Traction is thus purely mechanical and the available static torque is what the internal combustion engine 2 can provide.

In a second startup mode, the friction clutch 15 is disengaged, so that there is no mechanical connection between the internal combustion engine 2 and the wheels of the vehicle, the first electric machine 5 is deactivated and the second electric machine 8 operates as a motor, supplied by the accumulating device 20. Traction is thus purely electric and the available static torque is what the second electric machine 8 can provide depending on the maximum current dispensable by the accumulating device 20. In this mode the available static torque is therefore limited by the features of the accumulating device 20 and is normally rather low. This mode is therefore usable when static torque of limited value is required.

In a third startup mode the system is in serial hybrid configuration. The friction clutch 15 is disengaged, the internal combustion engine 2 actuates the first electric machine 5, which operates as a generator. The first electric machine 5 supplies the second electric machine 8, which operates as a motor and drives the wheels of the vehicle. In this mode, the static torque is that provided by the second electric machine 8 and depends exclusively on the features of the second electric machine 8.

In a fourth startup mode, the system is in parallel hybrid traction configuration, i.e. with the internal combustion engine 2 connected to the wheels of the vehicle by means of engagement of the friction clutch 15 and with one, or both, the electric machines 5 and 8 operating as a motor supplied by the accumulating device 20. The static torque available to the wheels is thus the sum of the static torque provided by the engine 2 and the static torque provided by one or both the electric machines 5, 8. This fourth startup mode is particularly indicated when high static torque is required, for example when the vehicle is under a full load or a start on a slope has to be performed.

Varying Speed-change Transmission Ratio

In order to vary the transmission ratio, with the friction clutch 15 disengaged, the speed-changing gear is placed in a neutral position by an actuator that is not shown and the driven shaft 6 is accelerated or slowed by means of the second electric machine 8 to synchronise the speed thereof with that required by the new transmission ratio to speed-changing gear to be engaged. Lastly, the actuator engages the pair of gear wheels 9, 11, or 10, 12 required to achieve the new transmission ratio.

Figure 2:
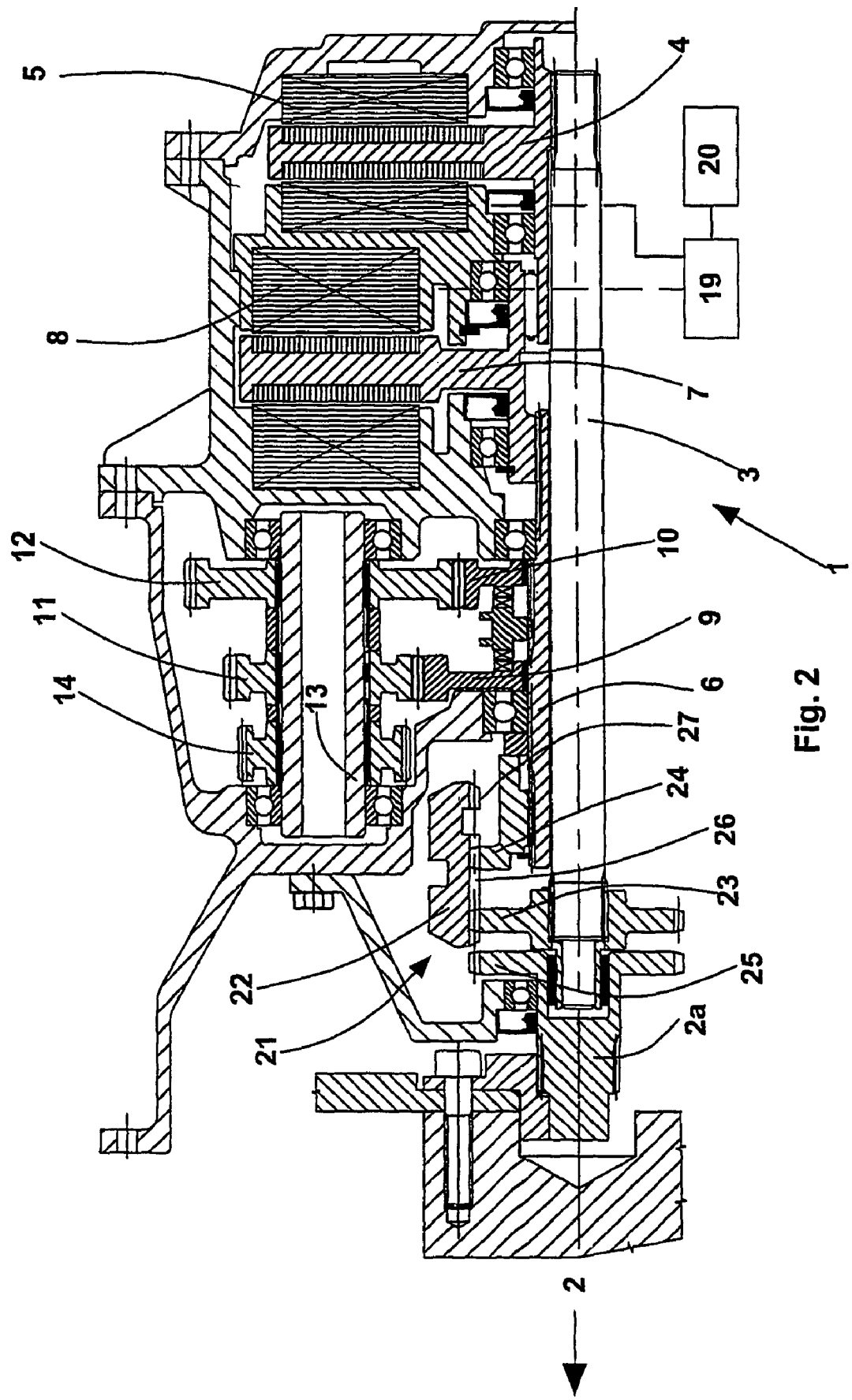
FIG. 2 is a longitudinal section of a second embodiment of a hybrid traction apparatus according to the invention.

In FIG. 2 there is illustrated a second embodiment of a traction system according to the invention, which differs from the embodiment illustrated in FIG. 1 through the fact that the coupling and the decoupling of the drive shaft 3 and of the driven shaft 6 are obtained, rather than by means of a friction clutch 15, by means of a three-position sleeve coupling device 21.

The drive shaft 3 and the driven shaft 6 at the respective ends facing the internal combustion engine 2 are provided with a first clutch element 23 and with a second clutch element 24 of known type, for example coupling elements with front teeth; similarly, the outlet shaft 2a of the internal combustion engine is provided at the end facing the engine shaft 3 and the driven shaft 6 with a further clutch element 25, similar to the clutch elements 23 and 24. The clutch elements 23, 24 and 25 are selectively couplable together by means of a slidable sleeve 22 that can take on three positions. The slidable sleeve 22 is provided, on the internal surface thereof, with a first coupling element 26 and with a second coupling element 27 suitable for coupling with the clutch elements 23, 24 and 25; the two coupling elements 26 and 27 being able to assume the shape of coupling elements with frontal teeth. The first coupling element 26 is suitable for coupling with the first clutch element 23 and with the second clutch element, or with the first clutch element 23 and the further clutch element 25, to connect them together, whilst the second coupling element 27 is suitable for coupling with the second clutch element 24, when the first coupling element is coupled with the first clutch element 23 and the further clutch element 25. In a first position, with the sleeve 22 moved to the right in FIG. 2, the first coupling element 26 of the sleeve 22 is coupled with the first clutch element 23 and with the second clutch element 24, that are thus connected together, thus achieving a connection between the drive shaft 3 and the driven shaft 6, whilst the internal combustion engine is disconnected from the drive shaft 3. In this condition the vehicle is driven by purely electric traction by one, or both, the two electric machines 5 and 8 which operate as motors and transmit power to the auxiliary shaft 13 of the speed-changing gear. During the braking phase, both the electric machines can brake the vehicle, generating power.

In a second position, with the slidable sleeve 22 moved to a central position, the first coupling element 26 is coupled with the first clutch element 23 and with the further clutch element 25 that are thus connected together, thus achieving a connection between the shaft 2a of the internal combustion engine and the drive shaft 3, whilst the driven shaft 6 is released both by the internal combustion engine and from the drive shaft 3. In this condition, the motion mode with serial hybrid traction is achieved; traction to the vehicle is provided by the second electric machine 8, operating as a motor, which absorbs energy from the accumulating device 20, whilst the internal combustion engine drives, by means of the drive shaft 3, the first electric machine 5 that, by acting as a generator, provides electric energy to the accumulating device 20.

In a third position, with the slidable sleeve 22 completely moved to the left, the first coupling element 26 is coupled with the first clutch element 23 and with the further clutch element 25, whilst the second coupling element 27 is coupled with the second clutch element 24 in such a way that all the clutch elements 23, 24 and 25 are connected together, thus achieving a connection between the outlet shaft 2a of the internal combustion engine, the drive shaft 3 and the driven shaft 6. In this condition both the motion mode with purely mechanical traction and the motion mode with parallel hybrid traction can be achieved; vehicle traction can be provided by just the internal combustion engine, whilst the electric machines 5 and 8 can be operated as generators, to produce electric energy to be stored in the accumulating device 20, alternatively, the electric machines 5 and 8 can be used, operated individually or together as motors to provide energy to the wheels of the vehicle parallel to the internal combustion engine, or remain deactivated.

The sequence of the three positions of the slidable sleeve 22 corresponds to the energetically most correct sequence of the traction configurations of the vehicle in the case of a departure from a stationary condition, until the motion condition with maximum power is reached.

In FIG. 3 there is illustrated a further embodiment of a traction system according to the invention comprising an internal combustion engine 102 (not shown) the outlet shaft of which is connected mechanically to a drive shaft 103, that drives the satellite holder 104a of a planetary device 104 that carries a plurality of satellite gears 104c that engage with a central sun gear 104b that is connected to the rotor 105a of a first electric machine 105. The external crown 106 of the planetary device 104 that engages with the satellite gears 104c is connected to the rotor 107 of a second electric machine 108 and to a gear 109 that drives the final transmission of the motion to the wheels of the vehicle.

The second electric machine 108 is externally concentric on the first electric machine 105, with the stator 108a externally concentric on the stator 105b of the first electric machine and the rotor 107 outside the stator 108a and concentric on it. The two electric machines are enclosed in the same casing 112. The electric machines 105 and 108 are connected through electric power converting and controlling device 113 to accumulating device 114 of electric energy.

This configuration, with the two coaxial and concentric electric machines 105 and 107, enables the total radial dimensions of the transmission to be reduced, there being no eccentricities or intermediate gears that entail staggering of axes and shafts. The configuration furthermore enables the axial dimensions of the traction system to be reduced considerably with respect to the known configurations with coaxially aligned electric machines.

Furthermore, the fact that the rotor 107 of the second electric machine 108 is outside the stator 108a enables, for the same transverse dimensions, the torque dispensable by the second electric machine 108 to be maximised, and a very compact solution to be therefore obtained from the point of view of overall dimensions in a radial direction.

Lastly, the fact that the two electric machines 105 and 108 are enclosed and supported in the same casing that is common to the two machines may enable internal compensation of the forces and of the reaction torques to be achieved, in addition to obtaining a very compact and non-cumbersome structure of the two electric machines 105 and 108.

The mechanical power generated by the internal combustion engine 102 is divided into two fractions in the planetary device 104, which therefore acts as a power divider: a first fraction is transformed into electric power by the first electric machine 105, functioning as a generator, and reconverted into mechanical power by the second electric machine 108; the second fraction is added, on the crown 106 of the planetary device to the mechanical power generated by the second electric machine 108 and is then transmitted to the final transmission to the wheels of the vehicle.

In the process of dividing and subsequent recombination of the power, the torque and speed factors of the original power coming from the internal combustion engine are altered in such a way as to create a transmission ratio, between internal combustion engine and traction wheels, that is continuously variable between a field that extends also to negative values, i.e. with the possibility of reversing the motion direction of the vehicle.

The engine shaft 103 connects the internal combustion engine 102 to the body of the satellite holder 104a of the planetary device 104, to which it thus transmits the torque thereof and angular speed.

The sun gear 104b of the planetary device is connected to the rotor 105a of the first electric machine 105, whilst the external crown 106 is integral both with the rotor 107 of the second electric machine 108, and with the gear 109 that drives the final transmission to the wheels of the vehicle.

The distribution of the speeds between the three elements of the planetary device is governed by the known law of Willis.

$$\Omega s = \frac{z1 + z3}{z1} \Omega m - \frac{z3}{z1} \Omega c$$

where: $\Omega s$ is the speed of the sun gear 104b and of the rotor 105a of the first electric machine 105, $\Omega m$ is the speed of the satellite holder, $\Omega c$ is the speed of the crown 106 and also of the rotor 107 of the second electric machine 108 and of the gear 109; $z1$, $z3$ the number of teeth of the sun gear 104b and of the crown 106, respectively.

When the first electric machine 105 generates electric power, the rotor 105a thereof transmits a resistant torque Cs to the sun gear 104b, said torque gives rise to torque Cr on the external crown 106 and also to a torque Cm on the satellite holder 104a of the planetary device 104, these torques being linked to one another by the equilibrium relationships:

$$Cs/Cr = z1/z3 \quad (1)$$

$$Cs + Cr + Cm = 0 \quad (2)$$

Simultaneously, the electric power generated by the first electric machine 105 operating as a generator is used to supply the second electric machine 108 operating as a motor, the rotor 107 of which generates a torque C2 that is transmitted to the external crown 106.

Thus a torque Cu will act on the external crown 106, which is the sum of the torque Cr and of the torque C2.

If the torque Cu is of sufficient value to move transmission downstream, and in particular the traction wheels of the vehicle, the crown 106 starts to rotate in a direction that is concordant with the speed of the satellite holder 104a and simultaneously the speed of the sun gear 104b is reduced if the speed of the satellite holder 104a remains constant: the three speeds of the sun gear 104b, of the crown 106 and of the satellite holder 104a are linked only by the previously mentioned known law of Willis.

In order to increase the speed of the crown 106, and therefore of the traction wheels (if the speed of the satellite holder 104a remains unvaried), it is necessary to reduce the speed of the sun gear 104b, commanding through the electric control and regulation device 113 slowing of the rotor 105a of the first electric machine 105, and this also up to the point at which the sun gear 104b stops, whilst continuing to exchange torque with the first electric machine 105, by virtue of the equilibrium relationship of torques previously mentioned. In these conditions, the electric machine 105 operates in the condition of an lo electrically blocked rotor dissipating electric power.

If the first electric machine 105 inverts motion direction, i.e. starts to operate as a motor, whilst keeping the torque sign constant, the planetary device 104 changes from the function of divider to that of a power adder: the power entering through the satellite holder 104a is added to the power entering through the sun gear 104b, with the result that the rotation speed of the crown 106 will increase with the increase of the rotation speed of the rotor 105a of the first electric machine 105, still according to the known law of Willis, and also the power transmitted to the crown will be the sum of the power transmitted to the drive shaft 103 by the internal combustion engine and of the mechanical power generated by the first electric machine 105 operating as a motor.

In this case, the mechanical power on the crown 106 can be divided between a first fraction of mechanical power directed to the traction wheels and a second fraction of mechanical power necessary for dragging the second electric machine 108 to make it operate as a generator that produces the electric power necessary for supplying the first electric machine 105.

Until now it is supposed that the speed of the drive shaft 103 is constant, whilst the speed of the gear 109 connected to the crown 106 of the planetary device changes from a zero value to a progressively increasing speed, until the arrest of the sun gear 104b, and growing further, when the movement direction of the first electric machine 105 is inverted, changing it from operating as a generator to operating as a motor, whilst the second electric machine 108 in turn changes from operating as a motor to operating as a generator.

The planetary device thus achieves a transmission with continuous variation of the speed of the traction wheels that is achievable by acting on the regulation of the speed of the first electric machine 105 and of the second electric machine 108. The speed of the traction wheels can be varied further by adjusting the speed and power generated by the internal combustion engine 102, i.e. the speed of the drive shaft 103 and the power transmitted to the satellite holder 104a of the planetary device 104.

On the shaft 110 of the rotor 105a of the first electric machine 105 there is provided a braking device 111 that enables the shaft 110 to be locked, preventing the rotation thereof.

When the vehicle motion conditions are such as to require a substantially constant speed, by using the brake 111 it is possible to ensure that all the mechanical power supplied to the drive shaft 103 and transmitted to the planetary device 104 is transmitted to the traction wheels of the vehicle, thus excluding the electric machines 105 and 108.

This operating condition, with the rotor 105a of the first electric machine 105, and consequently with the sun gear 104b locked by the action of the brake 111, is different from the condition in which the sun gear 104b is kept locked by the non-braked rotor 105a of the first electric machine 105. In fact, in the latter case, there is dissipation of electric power in the first electric machine 105, whilst, when the rotor 105a is locked through the intervention of the brake 111, there is no dissipation of electric power in the first electric machine 105, thus with elimination of electrical losses and consequent increase in the efficiency of the transmission of power to the traction wheels.

The brake 111 is the control device of the functional change of the planetary device from power divider to ordinary train, with zeroing of all electrical losses that are characteristic of the chain of electric power, and the drawbacks that are characteristic of the situation of an electric machine in torque, i.e. the first electric machine 105 with an electrically locked rotor.

In practice, as the speed of the sun gear 104b approaches zero during the increase in vehicle speed to cruising speed the intervention of the brake 111 is commanded, which develops a resistant torque on the sun gear 104b, parallel to the braking torque developed by the first electric machine 105 operating as a generator until the arrest of the sun gear 104b: at this point, the brake 111 has to perform a function of retaining the torque on the sun gear 104b, which torque is proportional to what is dispensed by the internal combustion engine, and also to what is caused on the crown and is directed to the final transmission to the traction wheels.

With this kinematic configuration, and by choosing the fixed transmission ratios correctly, the ground speed variations of the vehicle are achieved only through the speed adjustments to the internal combustion engine, exactly as with vehicles provided with conventional transmissions, and within the context of a same transmission ratio. The characteristic of modern engines to provide great increases of drive torque up to 30%, from maximum power condition to maximum torque condition, enables almost constant power over a wide speed range of the drive shaft to be supplied and thus wide vehicle speed ranges to be obtained even with constant transmission ratios. Thus the operating configuration with the rotor 105a of the first electric machine 105 braked by the brake 111, that enables temporary exclusion of the hybrid operating mode, is not prejudicial to the fine adjustment of the speed of the vehicle and enables the electrical losses to be zeroed that are associated with maintenance of electric locking of the rotor 105a by the control system 113.

Braking of the rotor 105a of the first electric machine 105 by means of the brake 111 is also used to be able to increase and regulate the static torque at the startup of the vehicle.

In fact, when the vehicle is stationary and has to be started up, the value of the static torque $Cu_s$, which is available in the absence of the intervention of the brake 111, is determined by the resistant torque Cs developed on the sun gear 104b by the rotor 105a of the first electric machine 105 operating as a generator and by the torque C2 transmitted to the crown 106 by the rotor 107 of the second electric machine 108 operating as a motor, according to the following formula:

$$Cu_s = Cs * z3/z1 + C2.$$

By actuating the brake 111, a further resistant torque Cf developed by the brake 111 is added to the resistant torque Cs developed by the first electric machine 105 until a resistant torque Cs+Cf value i reached equal to the maximum value of the torque dispensable by the combustion engine, possibly including also the inertia torque of the engine. In this way, the static torque $Cu_s$ available on the crown 106 will be equal to:

$$Cu_s = (Cs+Cf) * z3/z1 + C2$$

In this way static torque will be available that is sufficient to ensure the departure of the vehicle even in particularly heavy-duty conditions and which can reach a maximum value of:

$$Cu_{max} = Cm * z3/(z1+z3) + C2.$$

In which Cm represents the maximum value of the static torque that can be developed by the internal combustion engine 102.

In the practical embodiment, the materials, the dimensions and the constructional details may be different from those indicated, but be technically equivalent thereto without thereby falling outside the scope of the present invention.

What is claimed is:

1. Hybrid traction system for the traction of a vehicle comprising an internal combustion engine, at least a first electric machine and at least a second electric machine, a first transmission element suitable for being connected mechanically to said internal combustion engine and to at least one of said electric machines, a second transmission element suitable for being connected mechanically to at least one of said electric machines and to wheels of the vehicle, a braking device suitable for allowing the transmission of mechanical power to the wheels of the vehicle only by the internal combustion engine through said first transmission element and said second transmission element, wherein said first transmission element comprises a drive shaft that can be connected mechanically to said internal combustion engine, satellite holder means of a planetary device, suitable for carrying a plurality of planetary gears, and a sun gear of said planetary device, said sun gear being connected to a shaft of a rotor of said first electric machine, said sun gear being suitable for engaging with said planetary gears, said second transmission element comprising a crown of said planetary device that is connected to a rotor of said second electric machine and to a gear connected mechanically to the wheels of the vehicle, said crown being suitable for engaging with said planetary gears; said second electric machine being externally concentric to said first electric machine.

2. Hybrid traction system according to claim 1, wherein said braking device is suitable for mechanically stopping the rotation of the rotor of said first electric machine.

3. Hybrid traction system according to claim 1, wherein a stator of said second electric machine is externally concentric to a stator of said first electric machine and said rotor of said second electric machine is externally concentric to said stator of said second electric machine.

4. Hybrid traction system according to claim 1, wherein said first electric machine and said second electric machine are enclosed in a casing common to the two electric machines.

5. Hybrid traction system according to claim 2, wherein said first electric machine and said second electric machine are connected to a converting and regulating device of electric power, that is in turn connected to an accumulating device of electric energy.

6. Hybrid traction system according to claim 5, wherein said converting and regulating device is suitable for locking electrically the rotor of the first electric machine.

7. Hybrid traction system according to claim 5, wherein it is suitable for driving said vehicle in purely electrical traction mode, by means of at least one of said first electric machine and second electric machine operating as a motor, supplied by said accumulating device through said converting and regulating device, and with said internal combustion engine in a condition of inactivity.

8. Hybrid traction system according to claim 7, wherein said first electric machine is in a condition of inactivity and said second electric machine operates as a motor.

9. Hybrid traction system according to claim 7, wherein said first electric machine and said second electric machine operate as motors.

10. Hybrid traction system according to claim 2, wherein it is suitable for driving said vehicle in purely mechanical traction mode by means of said internal combustion engine, with said first electric machine and said second electric machine in a condition of inactivity, the rotor of said first electric machine being kept locked by said braking device.

11. Hybrid traction system according to claim 1, wherein it is suitable for driving said vehicle in serial hybrid traction mode, with said second electric machine operating as a motor, supplied by said first electric machine operating as a generator, rotated by said internal combustion engine.

12. Hybrid traction system according to claim 5, wherein it is suitable for driving said vehicle in parallel hybrid traction mode with said second electric machine operating as a motor, supplied by said accumulating device by means of said converting and regulating device, for transmitting mechanical power to the wheels of the vehicle, in parallel to said internal combustion engine, the rotor of said first electric machine being kept locked by said braking device.

13. Hybrid traction system according to claim 5, wherein it is suitable for driving said vehicle in parallel hybrid traction mode with said first electric machine and said second electric machine operating as motors supplied by said accumulating device by means of said converting and regulating device, for transmitting mechanical power to the wheels of the vehicle, parallel to said internal combustion engine.

14. Hybrid traction system according to claim 2, wherein said braking device is usable for regulating and maximising static torque that is transmittable to said gear connected mechanically to the wheels of the vehicle in a departure phase of said vehicle.

15. Hybrid traction system according to claim 1, wherein it is suitable for driving said vehicle in parallel hybrid traction mode with said first electric machine operating as a motor supplied by said second electric machine operating as a generator rotated by said internal combustion engine, for transmitting mechanical power to the wheels of the vehicle parallel to said internal combustion engine.

* * * * *